US012767062B2

(12) United States Patent
Miyaoka et al.

(10) Patent No.: US 12,767,062 B2
(45) Date of Patent: Oct. 20, 2026

(54) INPUT DEVICE

(71) Applicant: Panasonic Automotive Systems Co., Ltd., Kanagawa (JP)

(72) Inventors: Takeshi Miyaoka, Osaka (JP); Masahiro Jigi, Fukui (JP); Takeshi Masutani, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 323 days.

(21) Appl. No.: 18/665,195

(22) Filed: May 15, 2024

(65) Prior Publication Data

US 2024/0300419 A1 Sep. 12, 2024

Related U.S. Application Data

(63) Continuation of application No. PCT/JP2022/039479, filed on Oct. 24, 2022.

(30) Foreign Application Priority Data

Nov. 30, 2021 (JP) ................................ 2021-194532

(51) Int. Cl.
*B60R 11/02* (2006.01)
*A47C 7/68* (2006.01)
*B60R 11/00* (2006.01)

(52) U.S. Cl.
CPC ....... *B60R 11/02* (2013.01); *B60R 2011/0014* (2013.01)

(58) Field of Classification Search
None
See application file for complete search history.

(56) References Cited

U.S. PATENT DOCUMENTS 7,500,705 B2 * 3/2009 Vitito .................... B60K 35/81 348/837
10,440,633 B1 * 10/2019 Bastiyali ............... H04W 48/04
11,803,300 B2 * 10/2023 Park ....................... B60N 3/002
2009/0288123 A1 * 11/2009 Havlovick ......... B64D 11/0624 340/963
2018/0271287 A1 * 9/2018 Jacobs ................... A47C 1/124
2018/0281967 A1 * 10/2018 Stephens ............ B64D 11/0636
2019/0146596 A1 * 5/2019 Jiang ....................... G06F 3/044 345/174
2019/0184885 A1 * 6/2019 Preisler .................... A47B 1/10
(Continued)

FOREIGN PATENT DOCUMENTS

JP 2021041782 A 3/2021

OTHER PUBLICATIONS

International Search Report and Written Opinion, mailed Dec. 20, 2022, for PCT Patent Application No. PCT/JP2022/039479. (10 pages) (with English translation).

*Primary Examiner* — Ariel Mercado-Vargas
(74) *Attorney, Agent, or Firm* — Seed Intellectual Property Law Group LLP

(57) ABSTRACT

An input device includes: an operation table including: a touch sensor that receives an operation input; and a controller to which an output signal outputted from the touch sensor is inputted. The controller invalidates the output signal inputted to the controller, in at least one of following cases: (i) when the operation table is in middle of moving or is in a storage position where the operation table is stored, or (ii) when the input device is vibrating.

11 Claims, 8 Drawing Sheets

(56) References Cited

U.S. PATENT DOCUMENTS

| | | | | |
|---|---|---|---|---|
| 2021/0276717 | A1* | 9/2021 | Hennrich | B60N 3/002 |
| 2021/0323678 | A1* | 10/2021 | Kohlmeier-Beckmann | B64D 11/0638 |
| 2022/0196201 | A1* | 6/2022 | Rosado | F16M 11/2021 |
| 2023/0052066 | A1* | 2/2023 | Basu | B60R 21/013 |
| 2024/0205625 | A1* | 6/2024 | Banba | H04R 29/00 |

* cited by examiner

FIG. 9

Relationship between "presence detected or not" indications by first and second detectors and positions of operation table

| | | Second detector | |
|---|---|---|---|
| | | Presence-detected | Presence-undetected |
| First detector | Presence-detected | — | Storage position p0 |
| | Presence-undetected | Operation permitted position p3 | Middle of moving |

Relationship between positions of operation table and output signals of touch sensor

| Position of operation table | Output signal s1 of touch sensor |
|---|---|
| Storage position p0 | Invalidated |
| Middle of moving | Invalidated |
| Operation permitted position p3 | Validated |

INPUT DEVICE

CROSS REFERENCE TO RELATED APPLICATIONS

This is a continuation application of PCT International Application No. PCT/JP2022/039479 filed on Oct. 24, 2022, designating the United States of America, which is based on and claims priority of Japanese Patent Application No. 2021-194532 filed on Nov. 30, 2021.

FIELD

The present disclosure relates to an input device that includes an operation table.

BACKGROUND

PTL 1 discloses a vehicle seat table device provided with a table that can be stored in a fixed-type armrest rises up beside a vehicle seat.

CITATION LIST

Patent Literature

PTL 1: Japanese Unexamined Patent Application Publication No. 2021-41782

SUMMARY

However, the device according to Patent Literature (PTL) 1 can be improved upon.

In view of this, the present disclosure provides an input device capable of improving upon the above related art.

In accordance with an aspect of the present disclosure, an input device includes: an operation table including: a touch sensor that receives an operation input; and controller to which an output signal outputted from the touch sensor is inputted, wherein the controller invalidates the output signal inputted to the controller, in at least one of following cases: (i) when the operation table is in middle of moving or is in a storage position where the operation table is stored, or (ii) when the input device is vibrating.

General or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

An input device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 9 is a diagram illustrating relationship among “presence detected or not” indications by a first detector and a second detector, positions of the operation table, and output signals of a touch sensor.

DESCRIPTION OF EMBODIMENT

Summary of the Present Disclosure

Figure 1:
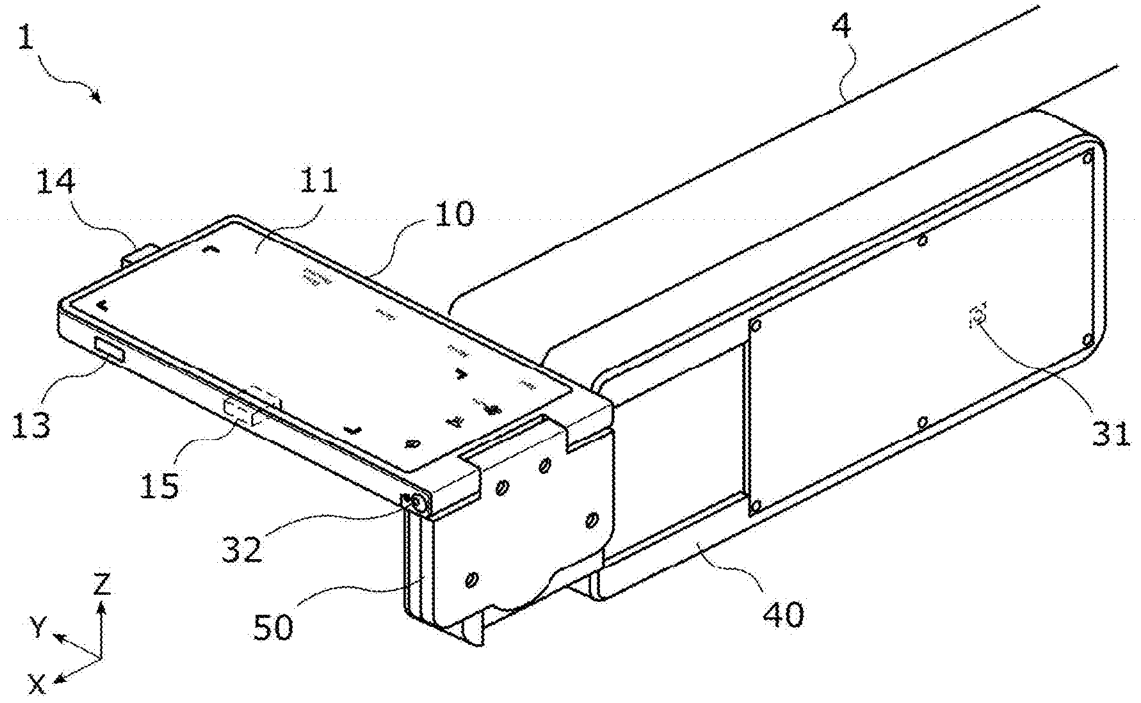
FIG. 1 is a perspective view of an input device according to an embodiment.

For example, a touch sensor that receives an operation input from a user is provided to a table provided near a seat in the cabin, making it possible to operate, for example, an illumination device, an air conditioning device, a navigation system, a presentation device, or the like in the cabin. In this case, for example, it is desirable to prevent an operational input that is not intended by the user from being made while the table is being drawn from a seat side, which otherwise results in operation that is not intended by the user via the table, or to prevent an operational input that is not intended by the user from being made due to vibration while the car is travelling, which otherwise results in operation that is not intended by the user via the table.

Accordingly, the present disclosure provides an input device capable of preventing operation that is not intended by the user from being made via the table provided with the touch sensor that receives an operation input from the user.

An input device according to an aspect of the present disclosure includes: an operation table including: a touch sensor that receives an operation input; and a controller to which an output signal outputted from the touch sensor is inputted, wherein the controller invalidates the output signal inputted to the controller, in at least one of following cases: (i) when the operation table is in middle of moving or is in a storage position where the operation table is stored, or (ii) when the input device is vibrating.

The output signal of the touch sensor is invalidated in this way when the operation table is in the storage position or in the middle of moving, so that it is possible to prevent operation that is not intended by the user from being made via the operation table. The output signal of the touch sensor is also invalidated when the input device is vibrating, so that it is possible to prevent operation that is not intended by the user from being made via the operation table.

It is possible that the input device further includes: a first detector that detects whether or not the operation table is in the storage position, wherein the controller invalidates the output signal when the controller determines that the operation table is in the storage position, based on a result of the detecting performed by the first detector.

According to this, it is possible to appropriately determine whether or not the operation table is in the storage position based on the detection by the first detector, and invalidate the output signal of the touch sensor when the operation table is in the storage position. Accordingly, it is possible to prevent operation that is not intended by the user from being made via the operation table.

It is possible that the input device further includes: a second detector that detects whether or not the operation table is in an operation permitted position where an operation performed using the operation table is permitted, wherein the controller invalidates the output signal when the controller (i) determines, based on the result of the detecting performed by the first detector, that the operation table is not in the storage position and (ii) determines, based on a result of the detecting performed by the second detector, that the operation table is not in the operation permitted position.

According to this, it is possible to appropriately determine the position of the operation table based on the detection by the first detector and the second detector and invalidate the output signal of the touch sensor when the operation table is nether in the storage position nor in the operation permitted position. Accordingly, it is possible to prevent operation that is not intended by the user from being made via the operation table.

It is possible that the controller validates the output signal when the controller (i) determines that the operation table is not in the storage position and (ii) determines, based on the result of the detecting performed by the second detector, that the operation table is in the operation permitted position.

According to this, it is possible to appropriately determine the position of the operation table based on the detection by the first detector and the second detector and validate the output signal of the touch sensor when the operation table is in the operation permitted position. Accordingly, it is possible to ensure that appropriate operation can be done via the operation table.

It is possible that the input device further includes: a sliding mechanism that is provided to an armrest in a vehicle and enables sliding movement of the operation table; and a rotating mechanism that is connected to the sliding mechanism and enables rotational movement of the operation table.

According to this, the sliding movement and the rotational movement of the operation table can be facilitated. Accordingly, handling of the operation table can be facilitated.

It is possible that the sliding mechanism includes a slide stopper that determines a movement end of the sliding movement of the operation table, and the rotating mechanism includes a rotation stopper that determines a movement end of the rotational movement of the operation table.

According to this, the operation table can be moved within a predetermined range. It is thus possible to appropriately determine the position of the operation table from the predetermined range. Accordingly, it is possible to prevent operation that is not intended by the user from being made via the operation table.

It is possible that the first detector is provided to the sliding mechanism, and that the second detector is provided to at least one of the rotating mechanism or the operation table.

According to this, it is possible to appropriately determine the position of the operation table in the sliding mechanism and the position of the operation table in the rotating mechanism. Accordingly, it is possible to prevent operation that is not intended by the user from being made via the operation table.

It is possible that the sliding mechanism enables the sliding movement of the operation table along a first axis extending in a front-back direction of the vehicle, that the rotating mechanism includes a first rotating mechanism and a second rotating mechanism, that the first rotating mechanism is connected to the sliding mechanism and enables the rotational movement of the operation table about a second axis extending in a width direction of the vehicle, and that the second rotation mechanism is connected to the first rotating mechanism and enables the rotational movement of the operation table about an axis parallel to the first axis.

According to this, for example, movement of the operation table from the storage position to the operation permitted position for the operation table can be facilitated. Accordingly, handling of the operation table can be facilitated.

It is possible that the input device further includes: an acceleration sensor that detects vibration of the input device, wherein the controller invalidates the output signal when the controller determines, based on a result of the detecting performed by the acceleration sensor, that the input device is vibrating.

According to this, it is possible to appropriately determine whether or not the input device is vibrating based on the detection by the acceleration sensor, and invalidate the output signal of the touch sensor when the input device is vibrating. Accordingly, it is possible to prevent operation that is not intended by the user from being made via the operation table.

It is possible that the controller invalidates the output signal when a voltage value of a signal outputted from the acceleration sensor as a result of the detecting performed by the acceleration sensor is greater than or equal to a predetermined voltage value.

According to the configuration, it is possible to appropriately detect the magnitude of the vibration of the input device, and invalidate the output signal of the touch sensor when the vibration is large. Accordingly, it is possible to prevent operation that is not intended by the user from being made via the operation table.

It is possible that the acceleration sensor is provided to the operation table.

According to the configuration, it is possible to appropriately detect whether or not the operation table is vibrating. Accordingly, it is possible to prevent operation that is not intended by the user from being made via the operation table.

Hereinafter, a certain exemplary embodiment will be described in detail with reference to the accompanying Drawings. The following embodiment is a specific example of the present disclosure. The numerical values, shapes, materials, constituent elements, and arrangement and connection configuration of the constituent elements, etc., described in the following embodiment are merely examples, and are not intended to limit the present disclosure. Among constituent elements in the following embodiment, those not described in any one of the independent claims indicating the broadest concept of the present disclosure are described as optional constituent elements.

Note that the respective figures are schematic diagrams and are not necessarily precise illustrations. Additionally, components that are essentially the same share like reference signs in the figures. Accordingly, overlapping explanations thereof are omitted or simplified.

In each figure, an axis along a front-back direction of the vehicle is designated as an X-axis, an axis along a width direction of the vehicle is designated as a Y-axis, and an axis along the vertical direction is designated as a Z-axis. The vehicle is, for example, an automobile, but is not a limitation and may be a movable body such as an electric railcar and the Shinkan-sen bullet train. The movement described below refers to movement of the operation table or the like in the vehicle and does not include movement of the operation table or the like caused by travelling of the vehicle.

Embodiment

[Configuration of Input Device]

The configuration of the input device according to the embodiment will now be described with reference to FIGS. 1 to 9.

Figure 2:
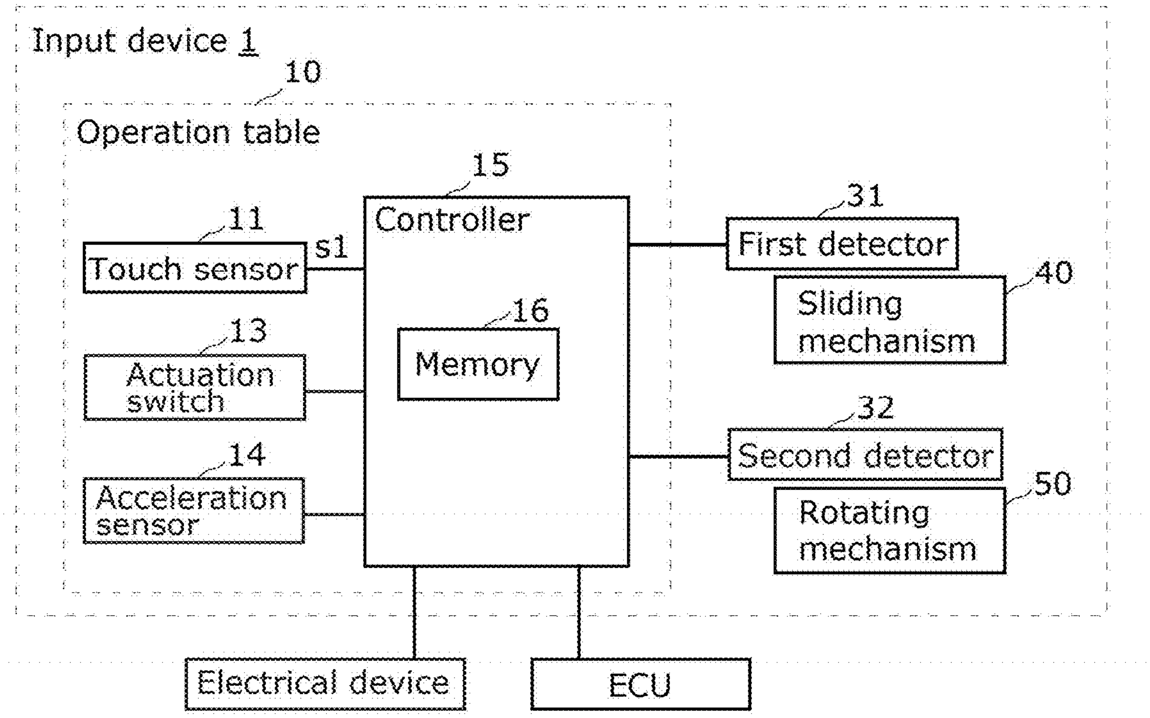
FIG. 2 is a block diagram of the input device according to the embodiment.

FIG. 1 is a perspective view of input device 1 according to the embodiment. FIG. 2 is a block diagram of input device 1.

As illustrated in FIGS. 1 and 2, input device 1 includes operation table 10, first detector 31, and second detector 32. Input device 1 also includes sliding mechanism 40 and rotating mechanism 50, which enable operation table 10 to move in the cabin. As illustrated in FIG. 1, input device 1 is supported by armrest 4 of a seat in the cabin. Here, operation table 10 is supported by armrest 4 via sliding mechanism 40 and rotating mechanism 50.

For example, operation table 10 is a user interface that accepts an operational input from a user who uses an electrical device. For example, operation table 10 is a device for operating electrical devices such as an illumination device, an air conditioning device, a seat heater, a video device, or an audio device in the cabin. When viewed in plan view from a direction perpendicular to an operation surface, operation table 10 has a rectangular shape.

Operation table 10 includes touch sensor 11, actuation switch 13, acceleration sensor 14, and controller 15.

Touch sensor 11 is, for example, a capacitive sensor that accepts a touch input on an operation surface of operation table 10. Touch sensor 11 includes, for example, one or more touch switches and a touch pad. The number of touch switches is not particularly limited and may be one or may be more than one. Each of the touch switches is a capacitive sensor that accepts a touch input on the operation surface of operation table 10. For example, the touch switch detects tapping. The touch pad is a capacitive sensor that accepts a touch input on the operation surface of operation table 10. For example, the user can gesture on the touch pad by swiping, pinching in, pinching out, and the like for touch input.

Touch sensor 11 accepts an operational input such as a touch input, and outputs output signal s1 corresponding to the operational input to controller 15. In the embodiment, a touch input and the like by a user may be denoted as an operational input, and operating an electrical device with operation table 10 may be denoted as operation by using operation table 10, operation via operation table 10, or the like.

Actuation switch 13 is a switch for switching between on and off of an actuated state of input device 1. Actuation switch 13 is provided, for example, on the side surface of operation table 10, which is not a limitation however and actuation switch 13 may be provided to sliding mechanism 40. Furthermore, actuation switch 13 may be provided on operation table 10 as one of the touch switches of touch sensor 11. With actuation switch 13 being turned on, input device 1 is brought into an actuated state.

Acceleration sensor 14 is a sensor that detects vibration of input device 1. Acceleration sensor 14 is externally attached, for example, to the side surface of operation table 10, which is not a limitation however and acceleration sensor 14 may be incorporated in operation table 10. Acceleration sensor 14 may be provided on an end of operation table 10 located on the opposite side to rotating mechanism 50 when viewed from operation table 10. Acceleration sensor 14 carries out detection by acceleration sensor 14 in normal circumstances in which input device 1 is active. Here, acceleration sensor 14 may carry out detection by acceleration sensor 14 only when operation table 10 is in operation permitted position p3 described later. A detected signal detected by acceleration sensor 14 is outputted to controller 15. The configuration of controller 15 will be described later.

Figure 3:
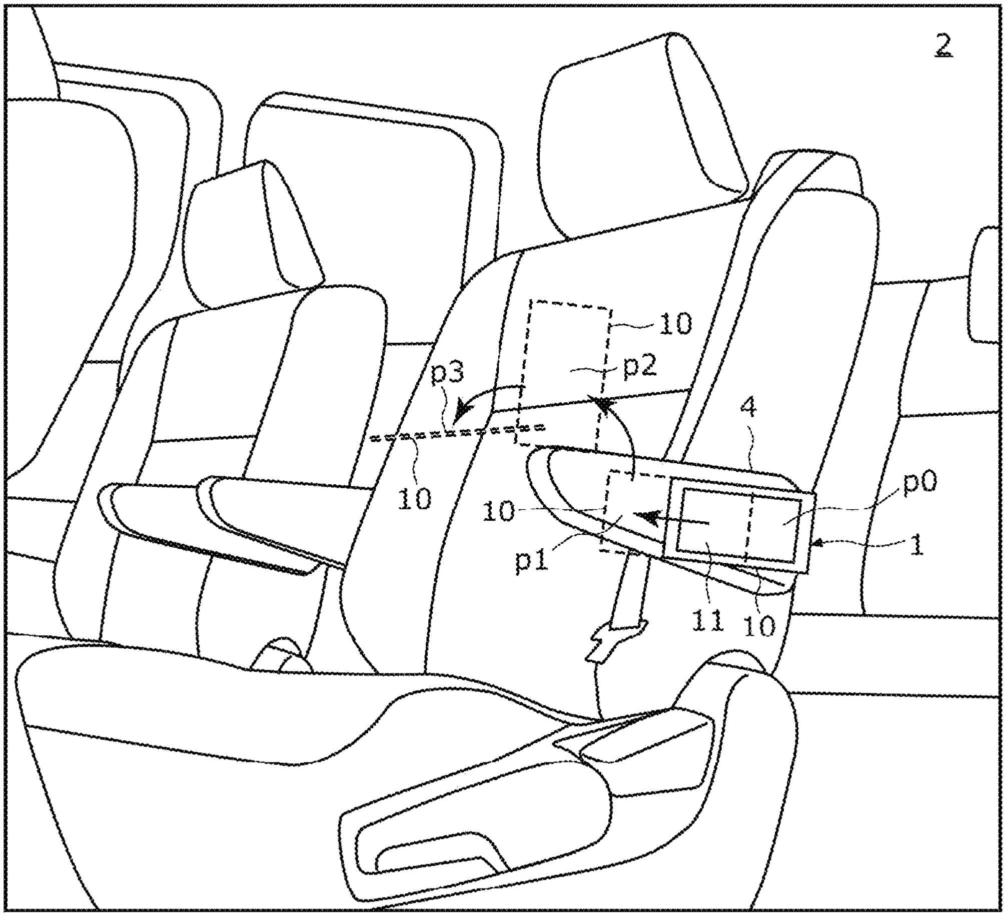
FIG. 3 is a diagram illustrating simplified actions of an operation table included in the input device.

FIG. 3 is a diagram illustrating simplified actions of operation table 10 included in input device 1. In FIG. 3, the thickness of operation table 10 is not illustrated.

As illustrated in FIG. 3, operation table 10 is brought into first intermediate position p1 from storage position p0 through sliding movement, brought into second intermediate position p2 from first intermediate position p1 through rotational movement, and brought into operation permitted position p3 from second intermediate position through rotational movement. In reverse, operation table 10 is brought into second intermediate position p2 from operation permitted position p3 through rotational movement, brought into first intermediate position p1 from second intermediate position p2 through rotational movement, and stored in storage position p0 from first intermediate position p1 through sliding movement. The sliding movement and the rotational movement of operation table 10 is performed manually, for example.

Storage position p0 is a position where operation table 10 is to be stored, and provided to a rear area of armrest 4 extending in the front-back direction. When operation table 10 is not in use, operation table 10 is positioned in storage position p0. In storage position p0, operation table 10 is positioned such that the longer direction of operation table 10 coincides with the front-back direction of vehicle 2, and the shorter direction coincides with the vertical direction.

First intermediate position p1 is a position taken after the rear portion of operation table 10 is slid to move forward from storage position p0. The orientation of operation table 10 in first intermediate position p1 is the same as the orientation of operation table 10 in storage position p0. That is, operation table 10 is positioned such that the longer direction of operation table 10 coincides with the front-back direction of vehicle 2, and the shorter direction coincides with the vertical direction.

Second intermediate position p2 is a position taken after operation table 10 undergoes 90-degrees rotational movement to rise up forward from first intermediate position p1. In second intermediate position p2, operation table 10 is positioned such that the longer direction of operation table 10 coincides with the vertical direction, and the shorter direction coincides with the front-back direction of vehicle 2.

Operation permitted position p3 is a position where operation by using operation table 10 is permitted. Operation permitted position p3 is a position taken after the upper portion of operation table 10 undergoes 90-degrees rotational movement to fall toward a sitting area of the seat from second intermediate position p2. Operation table 10 is positioned such that the longer direction of operation table 10 coincides with the width direction of vehicle 2, and the shorter direction coincides with the front-back direction of vehicle 2. In other words, in operation permitted position p3, operation table 10 is positioned in front of a seat back and is horizontal so as to face the sitting area. In this way, in operation permitted position p3, operation table 10 is positioned in front of a user in the seat. On input device 1, electrical devices are operated via operation table 10 in operation permitted position p3.

The configuration of input device 1 will now be described, while illustrating states of input device 1 in storage position p0, first intermediate position p1, second intermediate position p2, and operation permitted position p3.

Figure 4:
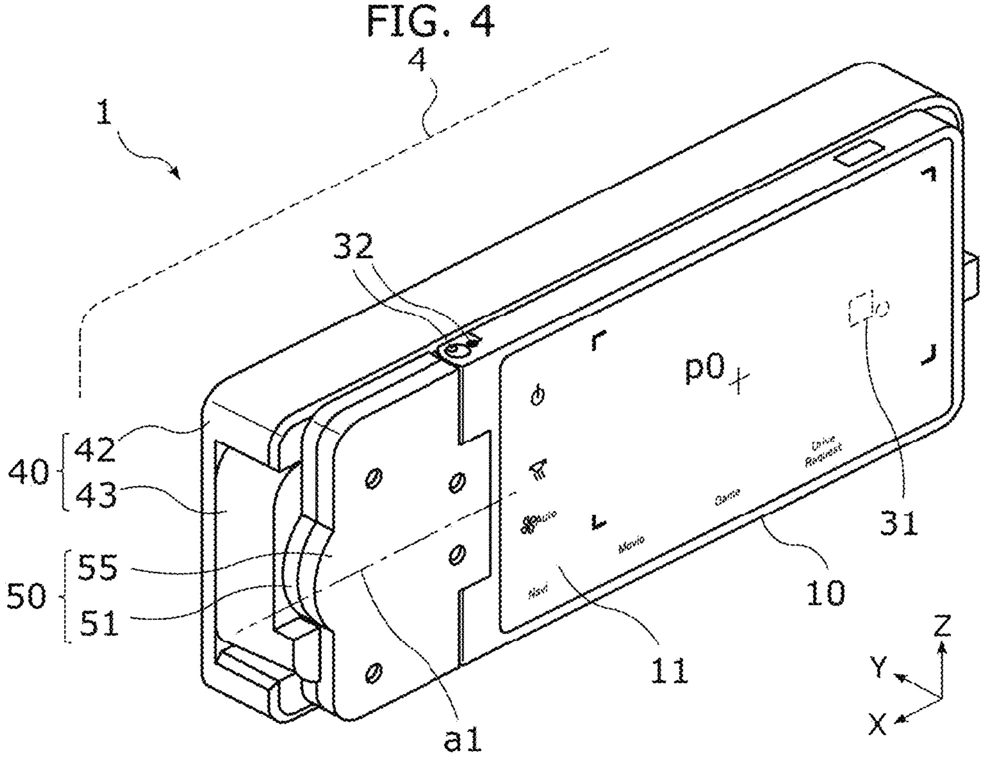
FIG. 4 is a diagram illustrating the input device when the operation table is in a storage position.
Figure 5:
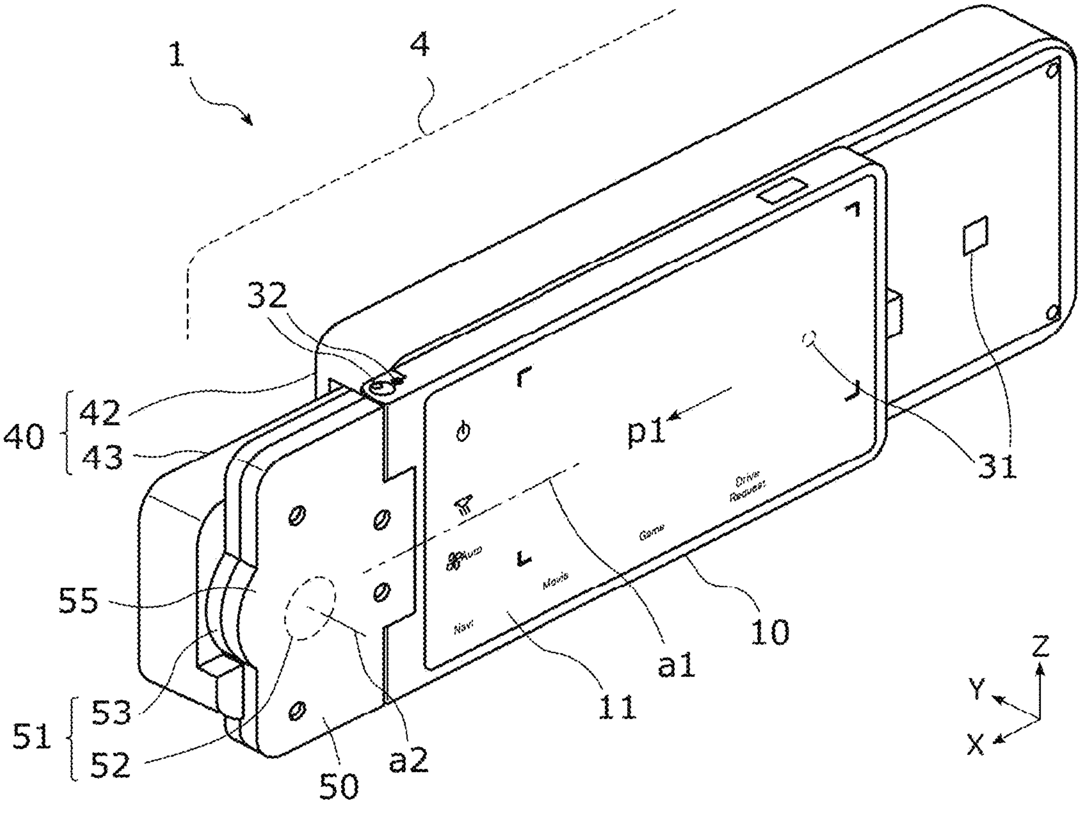
FIG. 5 is a diagram illustrating the input device when the operation table is in a first intermediate position.

FIG. 4 is a diagram illustrating input device 1 when operation table 10 is in storage position p0. FIG. 5 is a diagram illustrating input device 1 when operation table 10 is in first intermediate position p1. In the embodiment, for example, "operation table 10 is in a predetermined position" has the same meaning as "operation table 10 exists in the predetermined position" or "operation table 10 is positioned in the predetermined position".

Sliding mechanism 40 illustrated in FIGS. 4 and 5 is a mechanism that enables sliding movement of rotating mechanism 50, operation table 10, and the like. Sliding mechanism 40 is supported by armrest 4. Sliding mechanism 40 is attached, for example, to the side surface of armrest 4, which is not a limitation however and sliding mechanism 40 may be attached to either an upper surface or a lower surface of armrest 4. Sliding mechanism 40 may also be supported by armrest 4 via any other members. Rotating mechanism 50 described later is attached to sliding mechanism 40, and operation table 10 is attached to rotating mechanism 50.

Sliding mechanism 40 includes base 42 connected to armrest 4 and mover 43 that is linearly movable in a direction along first axis a1 relative to base 42. First axis a1 is an axis along the front-back direction of the vehicle. In other words, first axis a1 is an axis along the longer direction of operation table 10. First axis a1 is horizontal. However, first axis a1 is not necessarily horizontal, and may be inclined within a range of +/−10° with respect to the horizontal axis. Operation table 10 is movable along first axis a1 via sliding mechanism 40.

As illustrated in FIG. 4, operation table 10 is in a stored state when it is positioned in storage position p0, which is the rear area of armrest 4.

First detector 31 is a sensor that detects whether or not operation table 10 is in storage position p0. For example, first detector 31 is wired connected to controller 15 of operation table 10 through the wiring provided to input device 1. When input device 1 is provided with a power supply, first detector 31 may be actuated by the power supply of input device 1, and may be connected to controller 15 through wireless communication.

First detector 31 is formed from, for example, Hall element and a magnet, and provided to sliding mechanism 40. For example, the Hall element of first detector 31 is provided to base 42, and the magnet of first detector 31 is provided to mover 43. As illustrated in FIG. 4, when operation table 10 is in storage position p0, the Hall element of base 42 detects the magnet of mover 43. First detector 31 may be a Normally Close contact or may be a Normally Open contact. First detector 31 carries out detection by first detector 31 in normal circumstances in which input device 1 is active. A detected signal detected by first detector 31 (in the case of FIG. 4, presence-detected signal) is outputted to controller 15.

As illustrated in FIG. 5, when operation table 10 is positioned in first intermediate position p1, which is the front area of armrest 4, operation table 10 is brought into a drawn-out state from storage position p0. Sliding mechanism 40 includes a slide stopper that determines a movement end (end point) of sliding motion of sliding mechanism 40. First intermediate position p1 is determined by the position of the slide stopper.

In first intermediate position p1, first detector 31 detects that operation table 10 is not in storage position p0. As illustrated in FIG. 5, when operation table 10 is not in storage position p0 but is in first intermediate position p1, the Hall element of first detector 31 does not detect the magnet. The result of the detection by first detector 31 (in the case of FIG. 5, presence-undetected signal) is outputted to controller 15.

Figure 6:
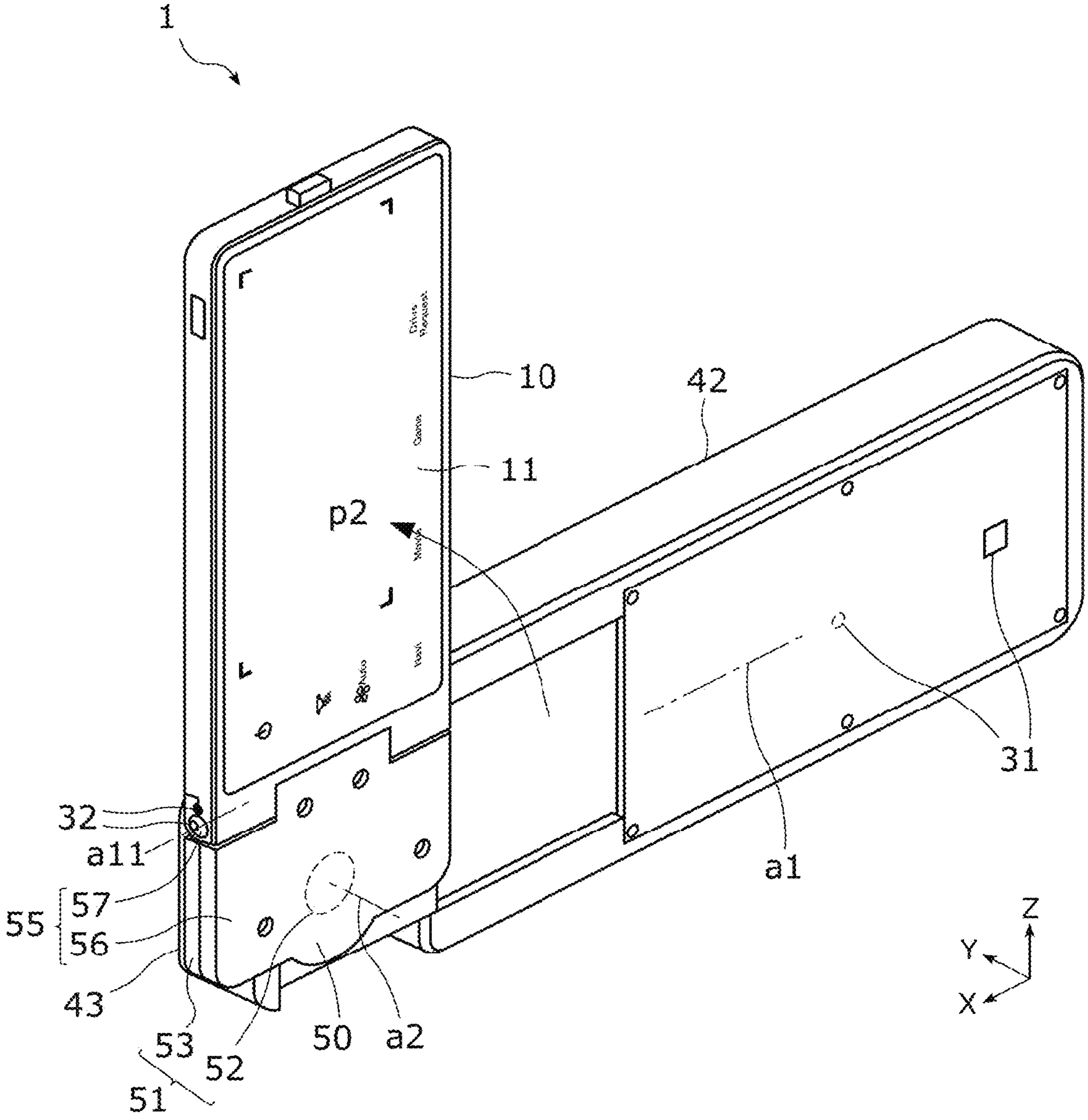
FIG. 6 is a diagram illustrating the input device when the operation table is in a second intermediate position.
Figure 7:
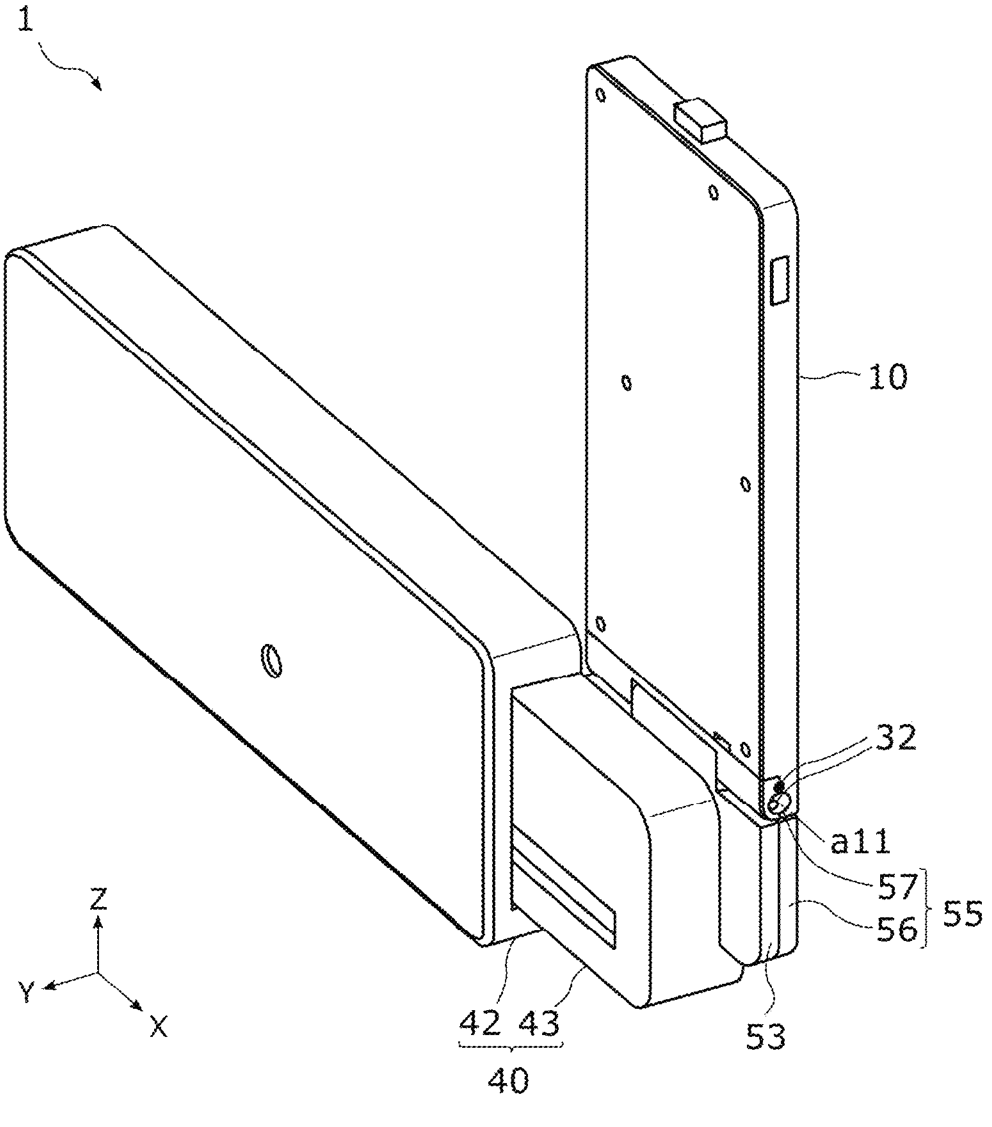
FIG. 7 is a diagram illustrating the input device when the operation table is in the second intermediate position from a different direction from that in FIG. 6.

FIG. 6 is a diagram illustrating input device 1 when operation table 10 is in second intermediate position p2. FIG. 7 is a diagram illustrating input device 1 when operation table 10 is in second intermediate position p2 from a different direction from that in FIG. 6.

Rotating mechanism 50 is a mechanism that enables rotational movement of operation table 10 attached to rotating mechanism 50. Rotating mechanism 50 is supported by sliding mechanism 40 (see FIG. 4). Furthermore, rotating mechanism 50 includes first rotating mechanism 51 and second rotating mechanism 55.

First rotating mechanism 51 illustrated in FIGS. 5 and 6 is a mechanism that enables rotational movement of second rotating mechanism 55 and operation table 10 about second axis a2. Second axis a2 is an axis extending along the width direction of vehicle 2. In other words, second axis a2 is an axis that extends in the horizontal direction and perpendicular to first axis a1. Second axis a2 is perpendicular to operation table 10 in first intermediate position p1.

First rotating mechanism 51 includes central shaft 52 along second axis a2 and swivel 53 that is rotatable about central shaft 52. Central shaft 52 is connected to mover 43 of sliding mechanism 40, and second rotating mechanism 55 is connected to swivel 53. For example, swivel 53 rises up toward the front of vehicle 2 about central shaft 52 through rotational movement, so that operation table 10 is brought into second intermediate position p2. First rotating mechanism 51 includes first rotation stopper that determines movement end (end point) of rotational movement, and second intermediate position p2 is determined by the position of first rotation stopper.

In second intermediate position p2, first detector 31 detects that operation table 10 is not in storage position p0. As illustrated in FIG. 6, when operation table 10 is not in storage position p0 but is in second intermediate position p2, the Hall element of first detector 31 does not detect magnet. The result of the detection by first detector 31 (in the case of FIG. 6, presence-undetected signal) is outputted to controller 15.

Figure 8:
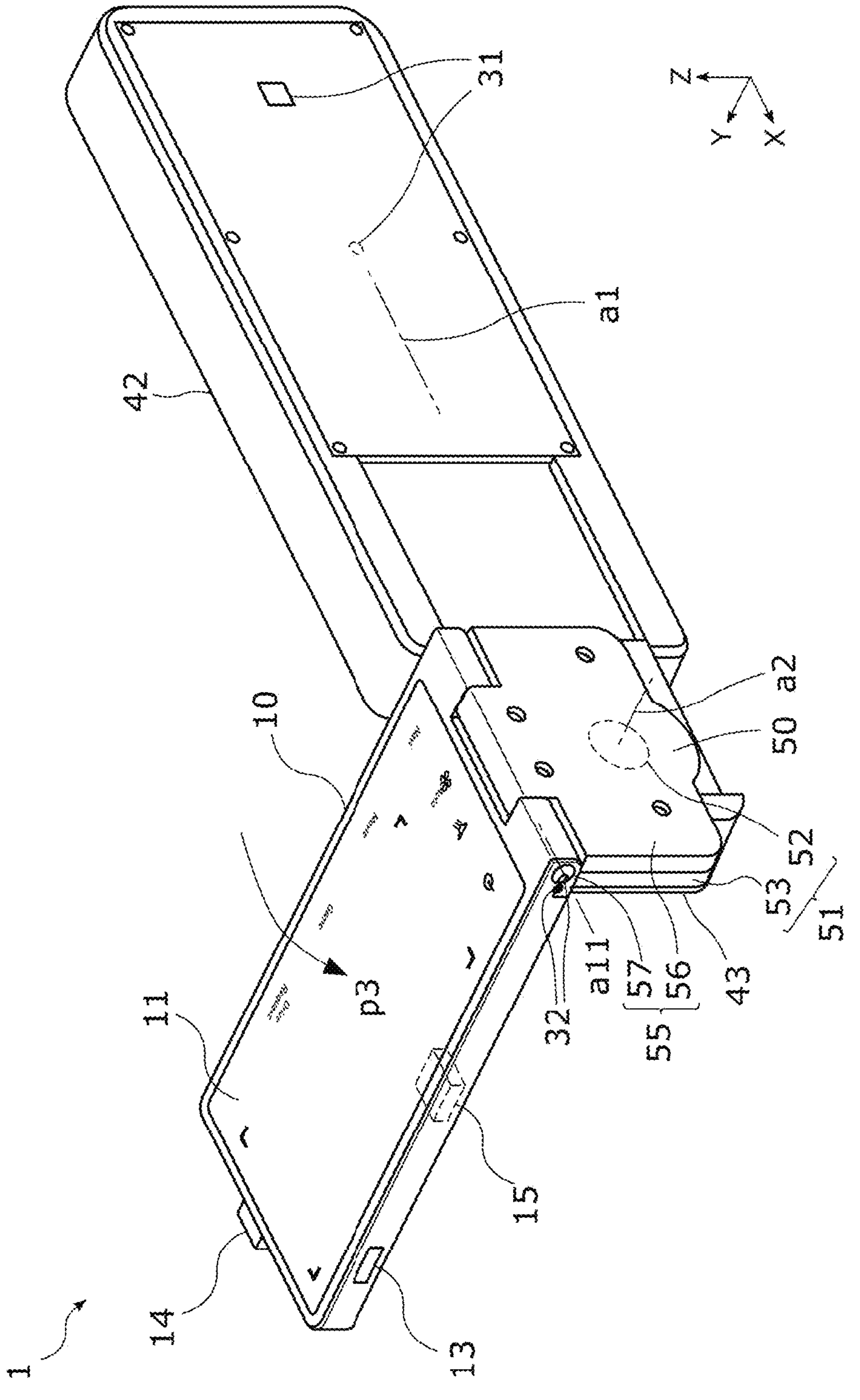
FIG. 8 is a diagram illustrating the input device when the operation table is in an operation permitted position.

FIG. 8 is a diagram illustrating input device 1 when operation table 10 is in operation permitted position p3.

Second rotating mechanism 55 illustrated in FIGS. 6 and 8 is a mechanism that enables rotational movement of operation table 10 about axis a11 parallel to first axis a1. parallel axis a11 is an axis extending along the front-back direction of vehicle 2. In other words, parallel axis a11 is an axis extending in horizontal direction in parallel to first axis a1. Furthermore, parallel axis a11 coincides with the shorter direction of operation table 10 in second intermediate position p2.

Second rotating mechanism 55 includes base 56 and central shaft 57 that coincides with parallel axis a11. Base 56 is connected to swivel 53 of first rotating mechanism 51, and operation table 10 is rotatably connected to central shaft 52. For example, operation table 10 falls toward the sitting area of the seat about central shaft 57 through rotational movement, so that operation table 10 is brought into operation permitted position p3. Second rotating mechanism 55 includes a second rotation stopper that determines movement end (end point) of rotational movement, and operation permitted position p3 is determined by the position of second rotation stopper.

Second detector 32 is a sensor that detects whether or not operation table 10 is in operation permitted position p3. For example, second detector 32 is wired connected to controller 15 of operation table 10 through the wiring provided to input device 1. Here, when input device 1 is provided with a power supply, second detector 32 may be actuated by the power supply of input device 1, and may be connected to controller 15 through wireless communication.

Second detector 32 is formed from, for example, Hall element and a magnet, is provided to at least one of rotating mechanism 50 and operation table 10. For example, the Hall element of second detector 32 is provided to operation table 10, and the magnet of second detector 32 is provided to central shaft 57 of second rotating mechanism 55. For example, as illustrated in FIG. 8, when operation table 10 is in operation permitted position p3, the Hall element of operation table 10 detects the magnet of central shaft 57. Second detector 32 may be a Normally Close contact or may be a Normally Open contact. Second detector 32 carries out detection by second detector 32 in normal circumstances in which input device 1 is active. A detected signal detected by second detector 32 (in the case of FIG. 8, presence-detected signal) is outputted to controller 15.

Controller 15 is a processor that controls functions of input device 1. Controller 15 is provided with memory 16, and a program for activating input device 1 is stored in memory 16. A control table that indicates relationship among "presence detected or not" indications by first detector 31 and second detector 32, positions of operation table 10, and output signal s1 of touch sensor 11 is saved in memory 16.

FIG. 9 is the control table that indicates relationship among "presence detected or not" indications by first detector 31 and second detector 32, positions of operation table 10, and output signal s1 of touch sensor 11.

Controller 15 controls functions of input device 1 based on a presence-detected or presence-undetected signal outputted from first detector 31 and second detector 32, and the control table saved in memory 16 (see FIG. 9).

When it is determined that operation table 10 is in storage position p0 based on "presence detected or not" indications of first detector 31 and second detector 32 illustrated in FIG. 9, controller 15 invalidates output signal s1 of touch sensor 11 inputted to controller 15. Note that invalidating means that controller 15 does not accept output signal s1 of touch sensor 11, ignores the signal, or does not transmit a signal based on output signal s1 to electrical device and the like.

When it is determined that operation table 10 is in the middle of moving based on "presence detected or not" indications of first detector 31 and second detector 32 illustrated in FIG. 9, controller 15 also invalidates output signal s1. "Operation table 10 is in the middle of moving" means that operation table 10 is still moving from storage position p0 to operation permitted position p3, and is located at a position neither in storage position p0 nor operation permitted position p3. First intermediate position p1 and second intermediate position p2 are included in the middle of moving.

On the other hand, it is determined that operation table 10 is not in storage position p0, but it is determined that operation table 10 is in operation permitted position p3 based on "presence detected or not" indications of first detector 31 and second detector 32 illustrated in FIG. 9, controller 15 validates output signal s1. Specifically, controller 15 accepts output signal s1, transmits a signal based on output signal s1 to an electrical device or ECU (Electronic Control Unit) to cause it to perform processing corresponding to the operational input.

Based on above-mentioned acceleration sensor 14, controller 15 also controls input device 1 as illustrated below.

When it is determined that input device 1 is vibrating based on a detected signal of acceleration sensor 14, controller 15 invalidates output signal s1 outputted from touch sensor 11. Specifically, when a voltage value of a signal outputted from acceleration sensor 14 is greater than or equal to a predetermined voltage value, controller 15 invalidates output signal s1. For example, when it is determined that input device 1 is vibrating, controller 15 invalidates output signal s1 for predetermined period T1. Predetermined period T1 is set as needed from, for example, a range between 0.2 and 0.8 seconds.

As described above, input device 1 according to the embodiment includes operation table 10 that includes touch sensor 11 that receives an operation input, and controller 15 to which output signal s1 outputted from touch sensor 11 is inputted. Controller 15 invalidates output signal s1 inputted to controller 15 in at least one of the following cases: (i) when operation table 10 is in the middle of moving or is in storage position p0 where operation table 10 is stored, or (ii) when input device 1 is vibrating.

As done by input device 1, when operation table 10 is in storage position or in the middle of moving, it is possible to prevent operation that is not intended by the user from being made via operation table 10 by invalidating output signal s1 of touch sensor 11. When input device 1 is vibrating, it is also possible to prevent operation that is not intended by the user from being made via operation table 10 by invalidating output signal s1 of touch sensor 11.

[Functions of Input Device]

Functions of input device 1 according to the embodiment will now be described with reference to FIG. 10.

Figure 10:
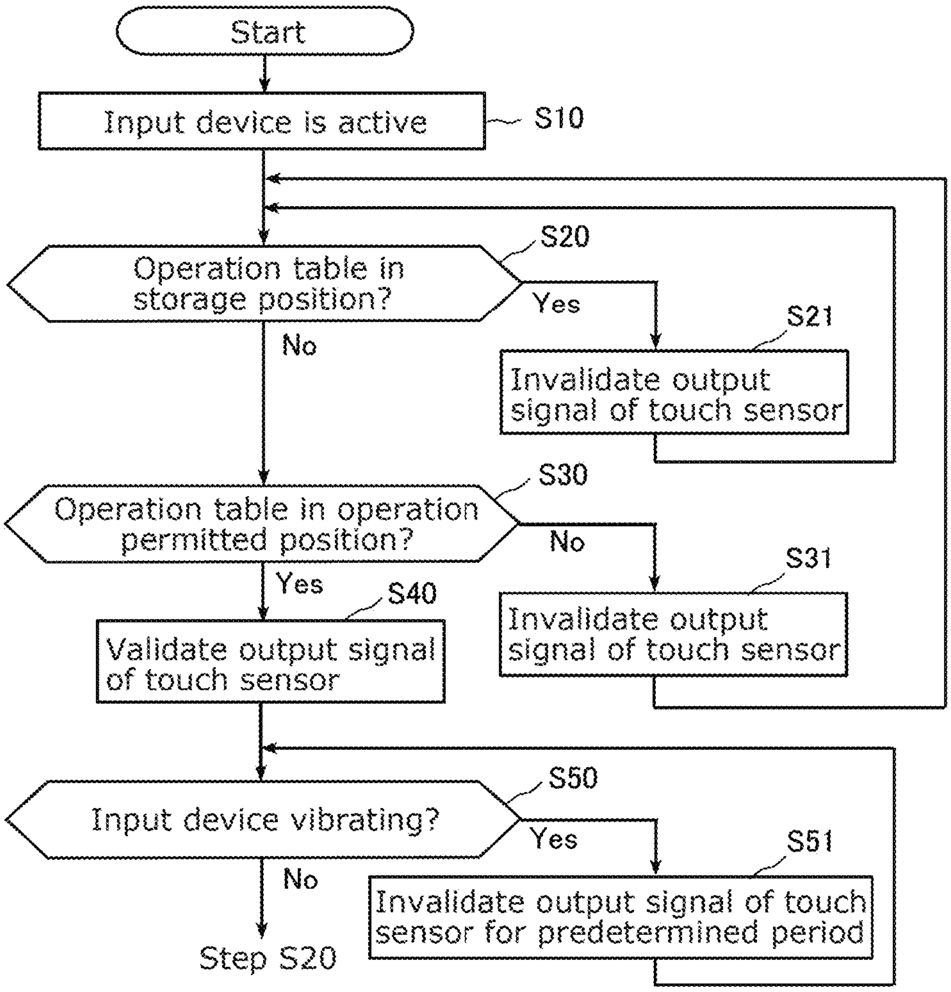
FIG. 10 is a flowchart illustrating functions of the input device according to the embodiment.

FIG. 10 is a flowchart illustrating functions of input device 1.

First, actuation switch 13 is turned on to bring input device 1 into an actuated state (step S10). Here, when actuation switch 13 is kept off, input device 1 is not brought into an actuated state.

In a state in which input device 1 is actuated, controller 15 determines whether or not operation table 10 is in storage position p0 based on the detection by first detector 31 (step S20). For example, controller 15 determines that operation table 10 is in storage position p0 when first detector 31 is outputting a presence-detected signal, and determines that operation table 10 is not in storage position p0 when first detector 31 does not output the presence-detected signal.

When it is determined that operation table 10 is in storage position p0 (Yes at S20), controller 15 invalidates output signal s1 of touch sensor 11 inputted to controller 15 (step S21). In this way, controller 15 inhibits operation by using operation table 10 in storage position p0. Controller 15 returns to step S20, and continues to control functions of input device 1.

On the other hand, when it is determined that operation table 10 is not in storage position p0 (No at S20), controller 15 proceeds to next step S30.

At step S30, controller 15 determines whether or not operation table 10 is in operation permitted position p3 based on the detection by second detector 32 (step S30). For example, controller 15 determines that operation table 10 is in operation permitted position p3 when second detector 32 is outputting a presence-detected signal, and determines that operation table 10 is not in operation permitted position p3 when second detector 32 does not output the presence-detected signal.

When it is determined that operation table 10 is not in operation permitted position p3 (No at S30), controller 15 invalidates output signal s1 of touch sensor 11 inputted to controller 15 (step S31). In this way, when operation table 10 is neither in storage position p0 nor in operation permitted position p3, controller 15 inhibits operation by using operation table 10. Controller 15 returns to step S20, and continues to control functions of input device 1.

On the other hand, when it is determined that operation table 10 is in operation permitted position p3 (Yes at S30), controller 15 validates output signal s1 of touch sensor 11 inputted to controller 15 (S40) to permit operation by using operation table 10. Specifically, when operation by using operation table 10 has been inhibited at the step preceding step S30, the inhibited state is removed.

In this way, operation by using operation table 10 is enabled by input device 1. Operation table 10 transmits a signal based on output signal s1 to an electrical device or ECU to cause it to perform processing corresponding to the operational input.

Furthermore, controller 15 determines whether or not input device 1 is vibrating based on the detection by acceleration sensor 14 (step S50). When it is determined that input device 1 is vibrating (Yes at S50), controller 15 invalidates output signal s1 of touch sensor 11 for predetermined period T1 (step S51). Consequently, operation using operation table 10 is inhibited for predetermined period T1. Controller 15 returns to step S50 after predetermined period T1, and continues to control functions of input device 1.

On the other hand, when it is determined that input device 1 is not vibrating based on the detection by acceleration sensor 14 (No at S50), controller 15 maintains a state in which operation on operation table 10 is permitted, returns to step S20, and continues to control functions of input device 1.

According to the functions of input device 1, when operation table 10 is in storage position p0 and when operation table 10 is neither in storage position p0 nor in operation permitted position p3, output signal s1 of touch sensor 11 is invalidated. According to this, it is possible to prevent operation that is not intended by the user from being made via operation table 10. According to the functions of input device 1, output signal s1 of touch sensor 11 is also invalidated when input device 1 is vibrating. According to this, it is possible to prevent operation that is not intended by the user from being made via operation table 10.

OTHER EMBODIMENTS

Although the input device according to one or more aspects of the present disclosure has been described based on the above embodiment, the present disclosure is not limited to this embodiment. Those skilled in the art will readily appreciate that embodiments arrived at by making various modifications to the above embodiment without materially departing from the scope of the present disclosure may be included within one or more aspects of the present disclosure.

In the embodiment, an example has been illustrated in which controller 15 determines whether operation table 10 is in storage position p0 or in operation permitted position p3 by using both first detector 31 and second detector 32, but it is not a limitation. For example, controller 15 may determine whether or not operation table 10 is in storage position p0 by using only first detector 31, or may determine whether or not operation table 10 is in operation permitted position p3 by using only second detector 32.

In the embodiment, an example has been illustrated in which operation table 10 is drawn forward from storage position p0 by sliding mechanism 40, and then brought into operation permitted position p3 after rotational movement occurs twice, but it is not a limitation. For example, when operation table 10 is stored in a table storage beside a seat in an upright manner, operation table 10 may be drawn in the vertical direction by the sliding mechanism (drawn along the longer direction of operation table 10), and then brought into the operation permitted position after rotational movement occurs once.

For example, in the above-described embodiment, each constituent element included in input device 1 may be configured in the form of an exclusive hardware product, or may be realized by executing a software program suitable for the constituent element. Each of the constituent elements may be realized by means of a program executing unit, such as a Central Processing Unit (CPU) or a processor, reading and executing the software program recorded on a non-transitory recording medium such as a hard disk or semiconductor memory.

Furthermore, the processing units of input device 1 may be implemented to a single processor together with an ECU and the like.

It should be noted that the following is also included in the present disclosure.

(1) It should also be noted that at least one of the above-described devices is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(2) It should also be noted that a part or all of constituent elements in at least one of the above-described devices may be implemented into a single Large Scale Integration (LSI). The system LSI is a multi-functional LSI in which a plurality of constituent elements are integrated into a single chip. An example of such a system LSI is a computer system including a microprocessor, a ROM, a Random Access Memory (RAM), and the like. A computer program is stored in the RAM. The system LSI circuit achieves its function as a result of the microprocessor operating according to the computer program.

(3) It should also be noted that a part or all of the constituent elements included in at least one of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(4) It should also be noted that the present disclosure may be the above-described method. The present disclosure may be a computer program causing a computer to execute the method, or digital signals indicating the computer program.

It should also be noted that the present disclosure may be a computer program or a non-transitory computer-readable recording medium on which digital signals are recorded. Examples of the non-transitory computer-readable recording medium are a flexible disk, a hard disk, a Compact Disc-Read Only Memory (CD-ROM), a Digital Versatile Disc (DVD), a DVD-ROM, a DVD-RAM, a BD (Blu-ray(trademark) Disc), and a semiconductor memory. The present disclosure may be the digital signals recorded on such a recording medium.

It should also be noted that, as the present disclosure, the computer program or the digital signals may be transmitted via electric communication line, a wired or wireless an communication line, a network represented by the Internet, data broadcasting, and the like.

It is also possible that the program or the digital signals may be recorded onto the recording medium to be transferred, or may be transmitted via a network or the like, so that the program or the digital signals can be executed by a different independent computer system.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2021-194532 filed on Nov. 30, 2021, and PCT International Application No. PCT/JP2022/039479 filed on Oct. 24, 2022.

INDUSTRIAL APPLICABILITY

The present disclosure is useful as an input device for operating electrical devices in the cabin.

The invention claimed is:

1. An input device comprising:
an operation table including:
a touch sensor that receives an operation input; and
a controller to which an output signal outputted from the touch sensor is inputted, wherein
the controller invalidates the output signal inputted to the controller, in at least one of following cases: (i) when the operation table is in middle of moving or is in a storage position where the operation table is stored, or (ii) when the input device is vibrating.

2. The input device according to claim 1, further comprising:
a first detector that detects whether or not the operation table is in the storage position, wherein
the controller invalidates the output signal when the controller determines that the operation table is in the storage position, based on a result of the detecting performed by the first detector.

3. The input device according to claim 2, further comprising:
a second detector that detects whether or not the operation table is in an operation permitted position where an operation performed using the operation table is permitted, wherein
the controller invalidates the output signal when the controller (i) determines, based on the result of the detecting performed by the first detector, that the operation table is not in the storage position and (ii) determines, based on a result of the detecting performed by the second detector, that the operation table is not in the operation permitted position.

4. The input device according to claim 3, wherein
the controller validates the output signal when the controller (i) determines that the operation table is not in the storage position and (ii) determines, based on the result of the detecting performed by the second detector, that the operation table is in the operation permitted position.

5. The input device according to claim 4, further comprising:
a sliding mechanism that is provided to an armrest in a vehicle and enables sliding movement of the operation table; and
a rotating mechanism that is connected to the sliding mechanism and enables rotational movement of the operation table.

6. The input device according to claim 5, wherein
the sliding mechanism includes a slide stopper that determines a movement end of the sliding movement of the operation table, and
the rotating mechanism includes a rotation stopper that determines a movement end of the rotational movement of the operation table.

7. The input device according to claim 5, wherein
the first detector is provided to the sliding mechanism, and
the second detector is provided to at least one of the rotating mechanism or the operation table.

8. The input device according to claim 5, wherein
the sliding mechanism enables the sliding movement of the operation table along a first axis extending in a front-back direction of the vehicle,
the rotating mechanism includes a first rotating mechanism and a second rotating mechanism,
the first rotating mechanism is connected to the sliding mechanism and enables the rotational movement of the operation table about a second axis extending in a width direction of the vehicle, and
the second rotating mechanism is connected to the first rotating mechanism and enables the rotational movement of the operation table about an axis parallel to the first axis.

9. The input device according to claim 1, further comprising:
an acceleration sensor that detects vibration of the input device, wherein
the controller invalidates the output signal when the controller determines, based on a result of the detecting performed by the acceleration sensor, that the input device is vibrating.

10. The input device according to claim 9, wherein
the controller invalidates the output signal when a voltage value of a signal outputted from the acceleration sensor is greater than or equal to a predetermined voltage value.

11. The input device according to claim 9, wherein
the acceleration sensor is provided to the operation table.

* * * * *